United States Patent
Kato (10) Patent No.: US 6,920,148 B1
(45) Date of Patent: Jul. 19, 2005

(54) SCHEDULING CONTROLLER AND A SCHEDULING CONTROL METHOD

(75) Inventor: Tetsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 661 days.

(21) Appl. No.: 09/635,131

(22) Filed: Aug. 9, 2000

(30) Foreign Application Priority Data

Aug. 10, 1999 (JP) .......................................... 11-226089

(51) Int. Cl.$^7$ .......................................... H04B 7/212
(52) U.S. Cl. ..................................... 370/442; 370/337
(58) Field of Search ................................ 370/431, 442, 370/395.4, 390, 517, 519; 725/94

(56) References Cited

U.S. PATENT DOCUMENTS

| 5,506,848 | A | * | 4/1996 | Drakopoulos et al. | ...... 370/336 |
| 5,914,950 | A | * | 6/1999 | Tiedemann, Jr. et al. | ... 370/348 |
| 5,920,701 | A | * | 7/1999 | Miller et al. | ................. 709/228 |
| 5,923,650 | A | * | 7/1999 | Chen et al. | .................. 370/331 |
| 5,966,163 | A | * | 10/1999 | Lin et al. | ..................... 725/117 |
| 6,289,383 | B1 | * | 9/2001 | Rhine | .......................... 709/227 |
| 6,374,405 | B1 | * | 4/2002 | Willard | ......................... 725/94 |
| 6,470,006 | B1 | * | 10/2002 | Moulsley | ..................... 370/347 |
| 6,477,168 | B1 | * | 11/2002 | Delp et al. | ............... 370/395.4 |
| 6,661,788 | B2 | * | 12/2003 | Angle et al. | ................. 370/390 |

FOREIGN PATENT DOCUMENTS

JP 9-265459 10/1997

OTHER PUBLICATIONS

M.A. Arad et al., "A Generalized Processor Sharing Approach to Time Scheduling in Hybrid CDMA/TDMA," 17th Annual Joint Conference of the IEEE Computer and Commun. Soc. Proceedings, 1998, pp. 1164–1171.*
R. Sigle et al., "Fair Queueing Wireless ATM MAC Protocols," 9th IEEE International Symposium, Boston, MA., 1998, pp. 55–59.*
R. Sigle et al., "Fair Queueing Wireless ATM MAC Protocols," 9$^{th}$ IEEE International Symposium on Boston, MA., 1998, pp. 55–59.

* cited by examiner

Primary Examiner—Frank Duong
Assistant Examiner—Michael J. Moore
(74) Attorney, Agent, or Firm—Foley & Lardner LLP (57) ABSTRACT

In a scheduling controller and in a scheduling method, processing requests are efficiently scheduled by using the latest condition for the processing requests. In a base station, for each TDMA frame, a start/end time controller calculates a scheduling start time according to a predetermined scheduling end time and the types and the number of various processing requests buffered from a scheduling start time of a preceding frame to a scheduling start time of the pertinent frame. A scheduler accordingly allocates time slots to the TDMA frame.

13 Claims, 10 Drawing Sheets

SCHEDULING CONTROLLER AND A SCHEDULING CONTROL METHOD

BACKGROUND OF THE INVENTION

The present invention relates to a scheduling controller and a scheduling control method, and in particular, to a scheduling controller and a scheduling control method in which when various processing requests received, the scheduling of the requests is controlled according to a state of reception of the requests.

DESCRIPTION OF THE PRIOR ART

In the prior art, a scheduling controller of this kind receives requests for various processing and the scheduling thereof is carried out according to the requests to resultantly obtain optimal throughput in total. In conjunction with these scheduling controllers, description will now be given of a scheduling controller applied to a radio communication system employing a dynamic slot assignment (DSA) for a time division multiple access (TDMA).

Figure 7:
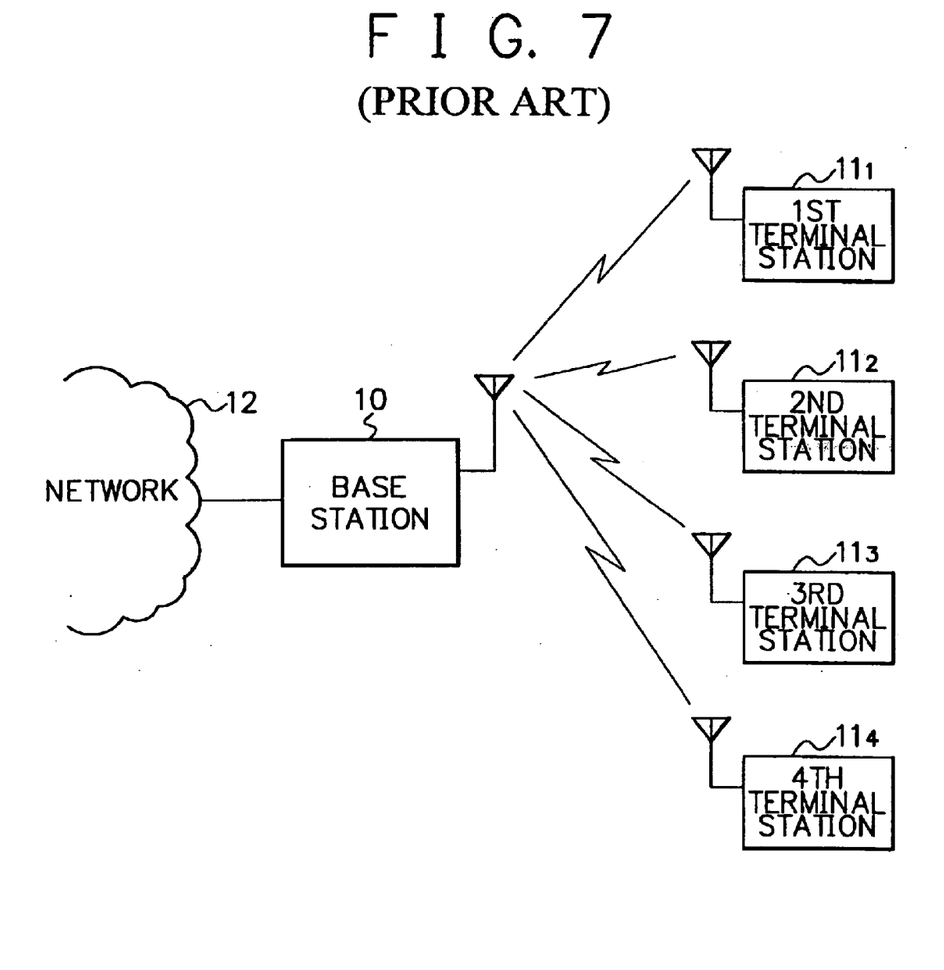
FIG. 7 is a diagram generally showing a configuration of a scheduling controller of the prior art in a radio communication system conducting DSA.

FIG. 7 schematically shows a configuration of a radio communication system using a scheduling controller conducting DSA according to the prior art. This system includes a base station 10, first to fourth terminal stations $11_1$ to $11_4$, and a network 12 including a data communication network and/or a subscriber's network. For communication between base station 10 and each terminal station ($11_1$–$11_4$), information is communicated using radio signals in the form of a fixed-length TDMA frame as a unit for transmission and reception. It is assumed that a direction from each terminal station ($11_1$–$11_4$) to base station 10 is a forward direction and a direction reverse thereto is a reverse direction.

Data or a control signal is communicated in the forward or reverse direction. Base station 10 centrally controls timing for the communication. Namely, base station 10 provides the timing to each terminal station ($11_1$–$11_4$). The communication timing is scheduled by base station 10 according to a transmission request issued from each terminal station ($11_1$–$11_4$) to base station 10 or a transmission request to terminal station ($11_1$–$11_4$) taking place in base station 10. In the scheduling, base station 10 allocates, by referring in an order of requests to information necessary for the scheduling such as a transmission band pass requested for each transmission, a transmission band pass associated with a necessary data length or the like in fixed-length frame using a time slot as an allocating unit.

Figure 1:
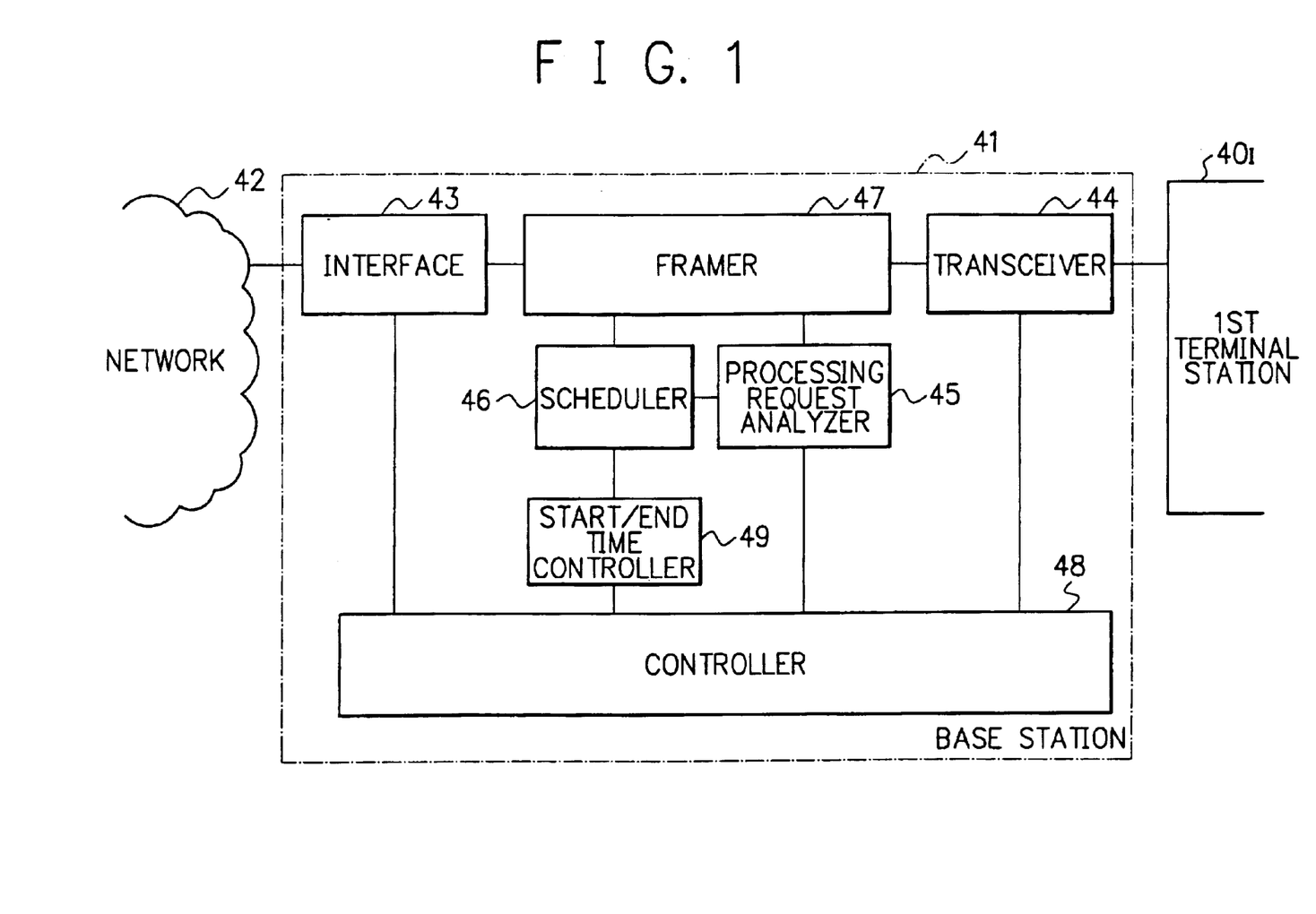
FIG. 1 is a block diagram showing a general configuration of an embodiment of a scheduling controller in accordance with the present invention in a base station of a radio communication system conducting DSA.
Figure 8:
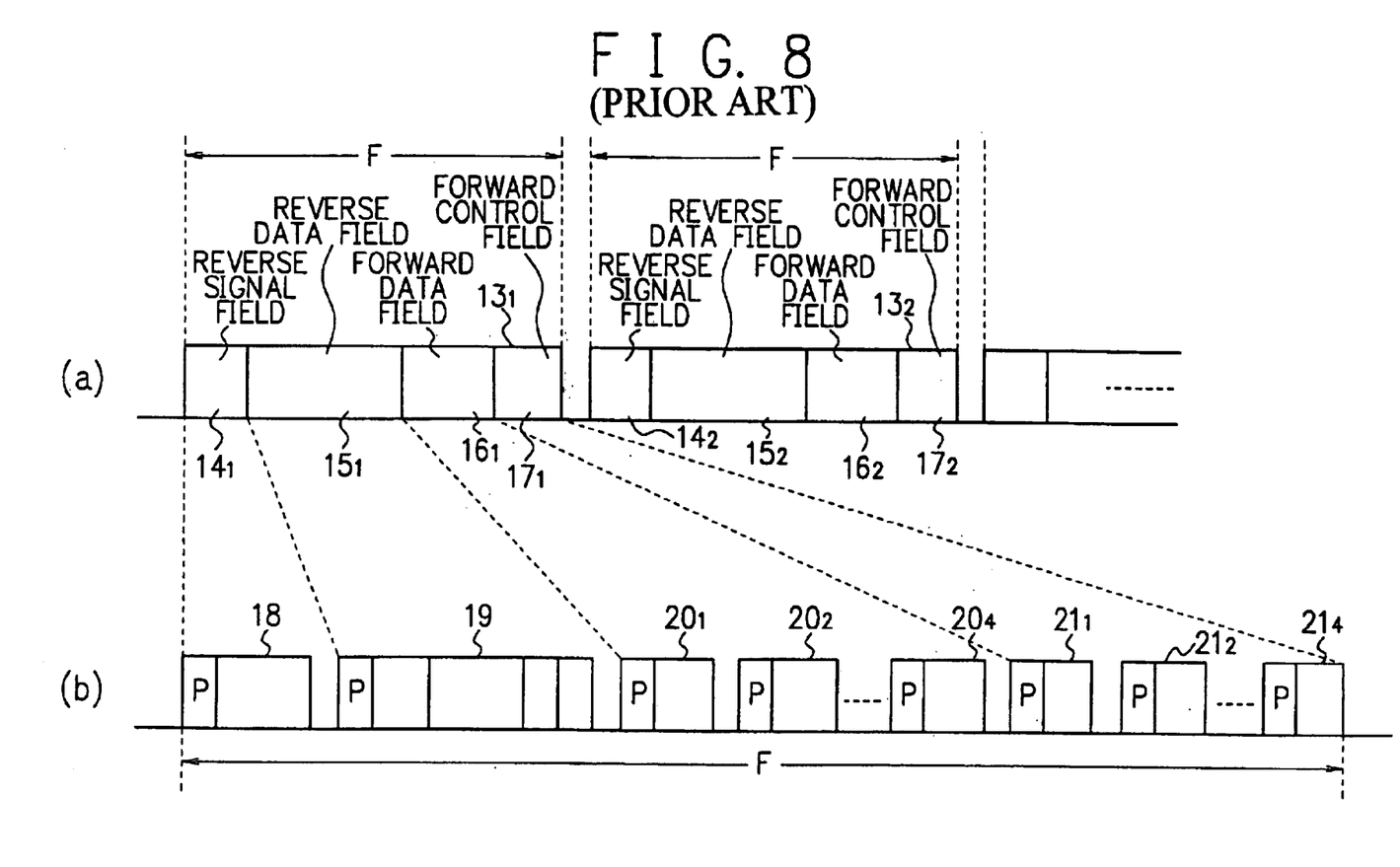
FIG. 8 is a diagram for explaining a layout of a TDMA frame.

FIG. 8 shows a layout of TDMA frames. TDMA frames communicated between a base station and a terminal station of the radio communication system of FIG. 1 are shown in an upper section (a) of FIG. 8. Constitution of the TDMA frames is shown in a lower section (b) of FIG. 8. As shown in FIG. 8($a$), the frame communication is conducted in a unit of a fixed length F frame between base station 10 and terminal stations $11_1$–$11_4$. Frame $13_1$ includes a reverse signal field $14_1$, a reverse data field $15_1$, a forward data field $16_1$, and a forward control field $17_1$. The other TDMA frames are similarly constructed.

Reverse signal field $14_1$ is used to store information to control communication timing and slot assignment information of each frame of each terminal station controlled by base station 10. Specifically, reverse signal field $14_1$ is sent to all terminal stations as burst data 18 including preamble information P of a fixed pattern in a first section thereof. Reverse data field $15_1$ is burst data 19 including transmission data from the pertinent terminal station allocated to a time slot assigned to the terminal and preamble information P of a fixed pattern placed in a first section of the time slot. Allocation or assignment of a time slot to each terminal station can be recognized by referring to slot assignment information stored in reverse signal field $14_1$ sent to the terminal stations from base station 10 as above.

Forward data field $16_1$ includes a plurality of burst data $20_1$ to $20_4$ individually transmitted from the respective terminal stations to base station 10. Timing at which the pertinent terminal station sends the burst data is indicated from base station 10 using the reverse signal field of a frame transmitted in advance of the burst data. The communication timing thus indicated has been scheduled according to a transmission request from each terminal station and a transmission request to each terminal station appearing in base station 10 before the previous frame. Forward control field $17_1$ includes, for each terminal station, a transmission request from the pertinent terminal station and a predetermined data length thereof. These items are transmitted at transmission timing beforehand determined. The transmission requests and the data lengths are stored in burst data $21_1$ to $21_4$ each including preamble information P of a fixed pattern in a first section thereof.

Base station 10 using DSA conducts the scheduling of transmission timing according to a transmission request and its data length from each terminal station according to forward control field $17_1$ in, for example, frame $13_1$ and a transmission request taking place in base station 10 to be sent via network 12 to each terminal station and a data length thereof. The transmission request and the data length indicate a request for a transmission band pass and correspond to a processing request accomplished in the scheduling controller of the prior art. In the scheduling, according to each of various requests from terminal stations, transmission data in a reverse direction and transmission data in a forward direction are assigned during a framing period F using a time slot as a unit for each terminal station. Therefore, in the reverse direction, data is sent from base station 10 to the terminal station having issued the transmission request, using time slots assigned to the terminal station. Each terminal station acquires data from the time slots assigned thereto to thereby receive reception data. In the forward direction, an allocation result of time slots of forward transmission data is notified to all terminal stations using reverse signal field $14_2$ of subsequent frame $13_2$. Each terminal station transmits data of which the request has been issued to base station 10, using time slot positions specified by the allocation result.

As above, the base station using DSA optimally controls the communication timing for various situations by dynamically changing, for each frame, time slots respectively specified in reverse transmission data field $15_1$ and forward transmission data field $16_1$.

Figure 9:
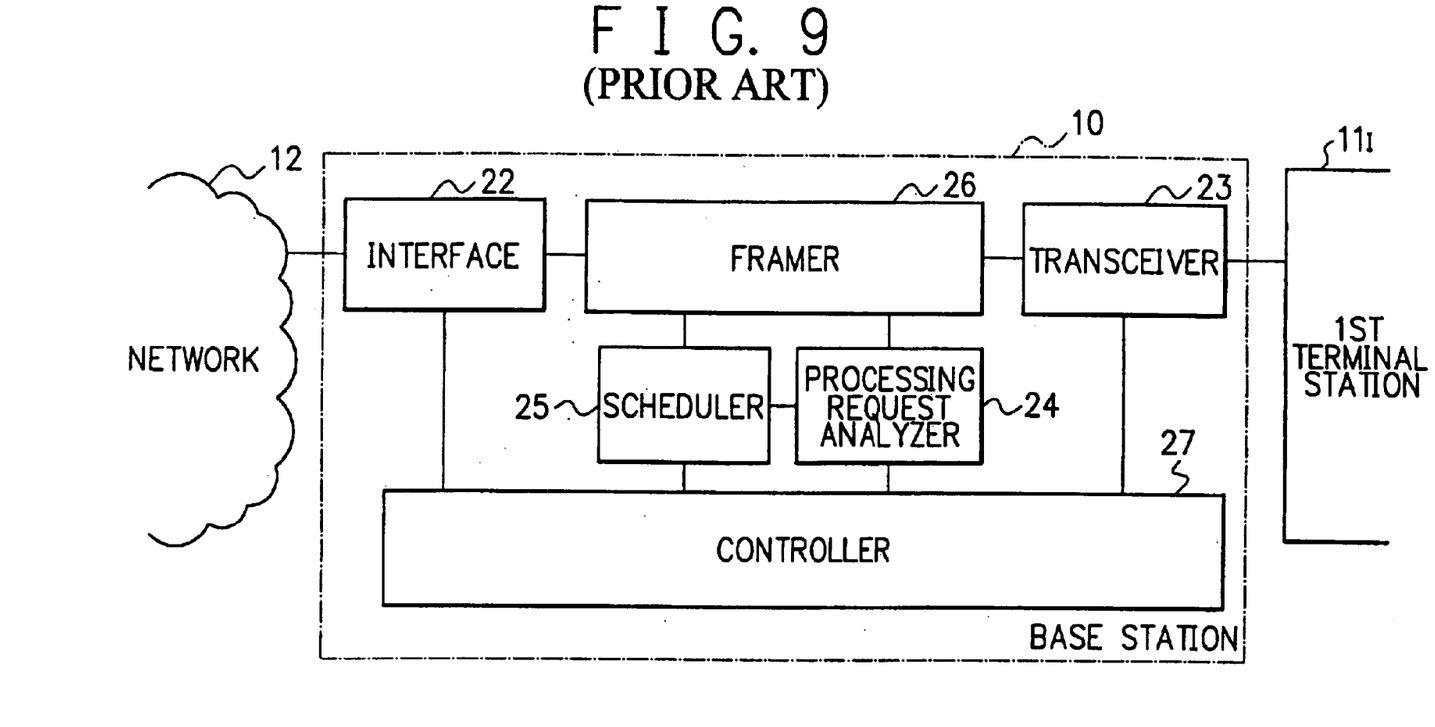
FIG. 9 is a block diagram showing a configuration of a primary section of a base station of the prior art.

FIG. 9 shows a primary section of base station conducting DSA as above. The primary section includes only a first terminal station $11_1$ as the terminal station to conduct radio communication with base station(s). Base station 10 includes an interface (IF) 22 to provide an interfacing function between communication signals on network 12 and inside signals of base station 10 and a transceiver 23 to achieve modulation and demodulation and transmission and reception of signals for the radio (or wireless) communication with all terminal stations including first terminal station $11_1$. Base station 10 further includes a processing request analyzer 24 for analyzing a band pass request associated with a data transmission request for data received via network 12 and a data length thereof as well as a data transmission request from each terminal station and a data length thereof, a scheduler 25 for allocating, for each terminal station in a transmission sequence, positions of communication timing and lengths thereof in a frame, a framer 26 for allocating, according to a scheduling result produced by scheduler 25, contents of processing to the points of actual time in the frame, and a controller 27 to control the respective functional components of base station 10.

When transceiver 23 receives forward transmission data and a control signal from a terminal station, controller 27 instructs processing request analyzer 24 to analyze a transmission request and a transmission data length to base station 10 which are notified by a forward control signal from the terminal station and a data transmission request taking place in base station 10 and a transmission data length of data to an associated terminal station. The transmission request occurring in base station 10 to the terminal station appears according to a state of data communication conducted via interface 22 with network 12. Controller 27 then instructs scheduler 25 to allocate, in response to a plurality of processing requests analyzed by analyzer 24, points of transmission time and lengths associated therewith in a frame in the time slot unit. The points of transmission time and lengths associated therewith thus allocated by scheduler 25 are notified to framer 26. Framer 26 refers to results of allocation, i.e., the points of transmission time and lengths associated therewith thus allocated by scheduler 25 and assigns, for each processing request, data and control signals to produce a TDMA frame as shown in FIG. 8. The TDMA frame is modulated by transceiver 23 and is transmitted therefrom.

To reflect the allocation result in a subsequent frame according to the transmission requests of the terminal stations and the base station, scheduler 25 must completely finish the scheduling by a predetermined point of time. Scheduler 25 achieving such a control operation includes a central processing unit (CPU), not shown, and can conduct the scheduling by a control program stored in a predetermined storage such as a read-only memory (ROM).

Figure 10:
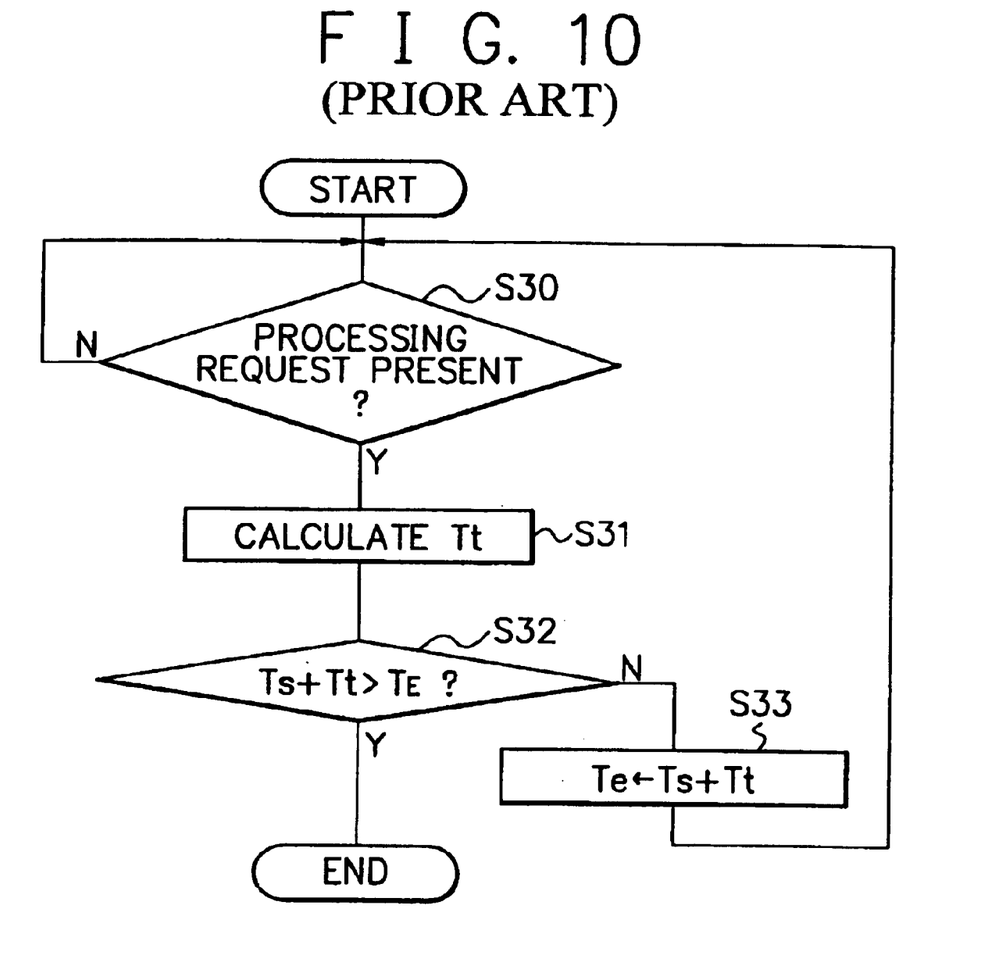
FIG. 10 is a flowchart showing a general flow of scheduling by a scheduler of the prior art.

FIG. 10 shows, in a flowchart, general processing of the scheduling by scheduler 25. It is assumed in the flowchart that Ts indicates a predetermined time to start the scheduling, TE is a predetermined time to end the scheduling to reflect a result of the scheduling in a subsequent frame, and Te designates a scheduling end time estimated.

On receiving an instruction from controller 27 to start the scheduling, scheduler 25 monitors by processing request analyzer 24 whether or not transmission requests analyzed are present (step S30). If such requests are detected (Y in step S30), scheduler 25 accumulates periods of time required for the respective transmission requests to obtain an accumulated or total period of time Tt necessary for the scheduling (step S31).

Scheduler 25 then adds the total time Tt to the predetermined scheduling start time Ts and then compares a result of the addition with the scheduling end time $T_E$ (step S32). If the result of addition is less than scheduling end time $T_E$ (N in step S32), scheduler 25 determines that there exists marginal time for the scheduling to process another processing request and then adds the result of addition to the end time Te (step S33). Scheduler 25 thereafter conducts the scheduling for the next request (step S30).

If scheduling end time $T_E$ is less than the result of addition (Y in step S32), scheduler 25 determines that there exists no sufficient time for the scheduling of another request and hence terminates the scheduling (end: shown by FIG. 10). That is, the result of scheduling of the processing requests which are assigned to end time Te by this point of time in step S33 is reflected in the next frame.

As above, scheduler 25 allocates processing requests to real time positions in an actual processing sequence. For scheduler 25, there are required functions and processing to optimally allocate processing requests in consideration of a frequency of processing requests and variation in processing time. Various techniques have been proposed for this purpose.

For example, Japanese Laid-Open Patent Application No. Hei 9-265459 (265459/1997) entitled "Data Processor Control Method" describes a technique in which according to a result of estimation of processing time, a control program is selected to achieve a starting selection and a processing sequence is changed according to the processing time estimated. More specifically, there is calculated in an information processing system a total processing end estimation time by totaling a remaining time of a processing request being executed, a wait time of an entire queue, and an estimation processing time for processing requests issued. By adding a processing request which causes the total processing end estimation time to take place in a smallest data processor, the sequence of processing requests sequentially occurring in a time series are also kept retained in the sequence of processing ends thereof. Therefore, the total processing time is minimized in the information processing system.

However, the scheduler in the base station using the scheduling controller of the prior art described in conjunction with FIGS. 9 and 10 accomplishes, even when the total time Tt necessary for the processing requests is sufficiently less than "Te–Ts", the scheduling of processing requests beginning at Ts beforehand determined as a scheduling start time at an early point of time in the frame. Therefore, after "Ts+Tt" at which the scheduling is completed, the scheduler waits for lapse of the scheduling end time $T_E$ beforehand determined ($T_E \geq$ Ts+Tt) in many cases.

That is, in consideration of a case in which the maximum number of processing requests take place, the scheduling start time Ts is set to an earlier point of time to reflect possibly many processing requests in the subsequent frame. This is because the reception time for the worst condition is required to be set for each frame. However, when the scheduling start time Ts is set to an excessively early point of time in a frame, since the scheduling is conducted using a condition for a processing request at an old point of time, the scheduler, if applied to a system in which the scheduling is required to be achieved in consideration of new and old conditions, leads to a problem that the scheduler cannot cope with processing requests whose contents change every moment.

Above the Application describes a technique in which the scheduling is conducted according to processing time estimated. However, the literature neither describes nor suggests a technique to efficiently terminate, by a predetermined point of time, the scheduling which efficiently reflects a latest condition. An object of the present invention is to provide a technique by which a scheduling controller efficiently reflects a latest condition.

SUMMARY OF THE INVENTION

It is therefore an object of the present invention to provide a scheduling controller and a scheduling method in which the scheduling is efficiently conducted to reflect a latest condition of processing requests.

In accordance with one aspect of the present invention, there is provided a scheduling controller comprising (1) request receiving means for receiving means for receiving a plurality of processing requests, (2) start time calculating means for calculating, according to a number of processing requests received by the request receiving means and types thereof, a scheduling start time relative to scheduling end time predetermined, and (3) scheduling means for scheduling processing requests received by the request receiving means from the scheduling start time calculated by the start time calculating means to the scheduling end time.

In accordance with a feature of the invention, the start time calculating means calculates total time necessary for the scheduling according the number of and types of processing requests received by the request receiving means and then calculates the scheduling start time relative to the predetermined scheduling end time. The scheduling means schedules the processing requests received by the request receiving means from the scheduling start time calculated to the scheduling end time.

In accordance with another aspect of the invention, a scheduling controller includes (1) request receiving means for receiving processing requests from a plurality of terminal stations, each of the processing request being a transmission band pass request and including a transmission request and a data length thereof, (2) start time calculating means for calculating, according to the processing requests received by the request receiving means, a scheduling start time relative to a scheduling end time predetermined, (3) scheduling means for allocating processing requests, received by the request receiving means from the scheduling start time calculated by the start time calculating means t the scheduling end time, to time slots in a frame, and (4) reporting means for reporting information of time slot allocation by the scheduling means to the terminal stations.

In accordance with a feature of the invention described, the start time calculating means calculates total time necessary for the scheduling according the number of and types of band pass requests from a plurality of terminal stations received by the request receiving means. Each of the transmission band pass requests includes a transmission request and a data length thereof. The start time calculating means accordingly calculates the scheduling start time relative to the predetermined scheduling end time. In the scheduling, the scheduling means allocates the transmission and pass requests, received by the request receiving means form the scheduling start time calculated to the scheduling end time, to time slots in a frame. The reporting means sends a result of allocation to the terminal stations. The dynamic slot assignment is thereby achieved.

In accordance with yet another feature of the invention, there is provided a scheduling controller that further includes storage means fro storing the scheduling end time predetermined. The start time calculating means calculates, according to the processing requests received by the request receiving means, a scheduling start time relative to the scheduling end time stored in the storage means.

In accordance with a feature of the invention, the scheduling controller includes the storage means for storing a scheduling end time predetermined. The start time calculating means reads the scheduling end time as a reference, total time necessary for the scheduling according to a the processing requests received by the request receiving means. The start time calculating means accordingly determines the scheduling start time. Therefore, since the scheduling end time can be set as a parameter to be varied if necessary, the scheduling can be more flexibly carried out.

In accordance with another feature of the invention a scheduling controller further includes processing time storage means for storing scheduling time beforehand determined for each of the processing requests. The start time calculating means calculates total time of scheduling time according to scheduling time corresponding to each processing request type stored in the processing time storage means and calculates, according to the processing requests received by the request receiving means, a scheduling start time relative to the scheduling processing end time.

In accordance with still another feature of the invention to calculate the scheduling start time, the start time calculating means reads processing time for each processing request stored in the processing time storage means and accumulates the processing time using the number of processing requests to thereby easily calculate the total time of scheduling processing time.

In accordance with another aspect of the invention, there is provided a scheduling method, comprising the steps of (1) receiving a plurality of processing requests, (2) calculating, according to a number of processing requests received by the request receiving step and types thereof, a scheduling start time relative to a scheduling end time predetermined, and (3) scheduling processing requests received by the request receiving step from the scheduling start time calculated by the start time calculating step to the scheduling end time.

Preferably, a plurality of processing requests is received by the request receiving step. In the start time calculating step, total time necessary for the scheduling is calculated according to a number of processing requests received by the request receiving step and types thereof to obtain a scheduling start time relative to a scheduling end time predetermined. In the scheduling step the processing requests received by the request receiving step, the processing requests received by the request receiving step from the scheduling start time calculated by the start time calculating step to the scheduling end time are scheduled.

In accordance with another aspect of the invention, there is provided a scheduling method, comprising the steps of (1) receiving processing requests from a plurality of terminal stations, each of the processing request being a transmission band pass request and including a transmission request and data length thereof, (2) calculating, according to the processing requests received by the request receiving step, a scheduling start time relative to a scheduling end time predetermined, (3) allocating processing requests received by the request receiving step from the scheduling start time calculated by the start time calculating step to the scheduling end time to time slots in a frame, and (4) reporting information of time slot allocation by the scheduling step to the terminal stations.

Preferably processing requests are received from a plurality of terminal stations in the request receiving step. Each of the processing requests is a transmission band pass request and includes a transmission request and a data length thereof. In the start time calculating step, total time necessary for the scheduling is calculated according to a number of processing requests received by the request receiving step and types thereof to obtain the scheduling start time relative to the scheduling end time predetermined. In the scheduling step, the scheduling is achieved such that the processing requests received by the request receiving step from the scheduling start time calculated by the start time calculating step t the scheduling end time are allocated to time slots in a frame. In this way, the dynamic slot allocation is achieved.

In the reporting step, information of a result of the scheduling is notified to the terminal stations.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring to the drawings, description will be given of an embodiment of the present invention.

FIG. 1 shows in a block diagram a general configuration of an embodiment of a scheduling controller in a base station of a radio communication system conducting DSA. The base station in this embodiment is applied to a radio communication system achieving DSA shown in FIG. 7. In the dynamic slot assignment or allocation, the TDMA frame described above is subdivided into slots as units of time. To change a transmission band pass when necessary, a slot position and a slot length represented by the number of slots to communicate data are controlled for each frame.

In a radio communication system including a base station 41, a plurality of terminal stations which communicate with the base station using radio signals, and a network 42 such as a data communication network and/or a subscriber's network, the radio communication is conducted between the base station and each terminal station using a fixed-length TDMA frame as a unit of communication. In this embodiment, like in FIG. 7, first to K-th terminal stations $40_1$ to $40_K$ communicate with the base station. Only first terminal station $40_1$ is shown in FIG. 1.

Base station 41 of this embodiment includes an interface 43 having a function to interface communication signals on network 42 with inside signals of base station 41 and a transceiver 44 which conducts modulation and demodulation and communication of signals for radio communication with all terminal stations including first terminal station $40_1$. Base station 41 includes a processing request analyzer 45 to analyze a band pass request associated with data transmission request and data length for data inputted via network 42 to each terminal station and a data transmission request and its data length notified from terminal station, a scheduler 46 to allocate, for each terminal station, a communication time position and length thereof in a frame in a transmission order, a framer 47 to allocate contents of processing to real time positions in a frame according to a result of scheduling generated by scheduler 46, a controller 48 to control each functional section of these components. Base station 42 further includes a start/end time controller 49 to achieve a start/end time control operation in which at least a scheduling start time or a scheduling end time is controlled according to a state of reception of various processing requests. In the description of this embodiment, controller 49 controls the scheduling start time.

When transceiver 44 receives forward transmission data and a control signal from each terminal station, controller 48 activates processing request analyzer 45 to analyze a transmission request and transmission data length which are notified to base station 41 by the forward control signal from the pertinent terminal station and a data transmission request appearing in base station 41 to transmit data to each terminal station and a transmission data length. The transmission request to each terminal station in base station 41 takes place according to a state of communication of data with network 42 via interface 43. Controller 48 instructs scheduler 46 to allocate, in response to a plurality of processing requests analyzed by analyzer 45, transmission time positions and lengths thereof in a frame in the time slot unit.

Figure 2:
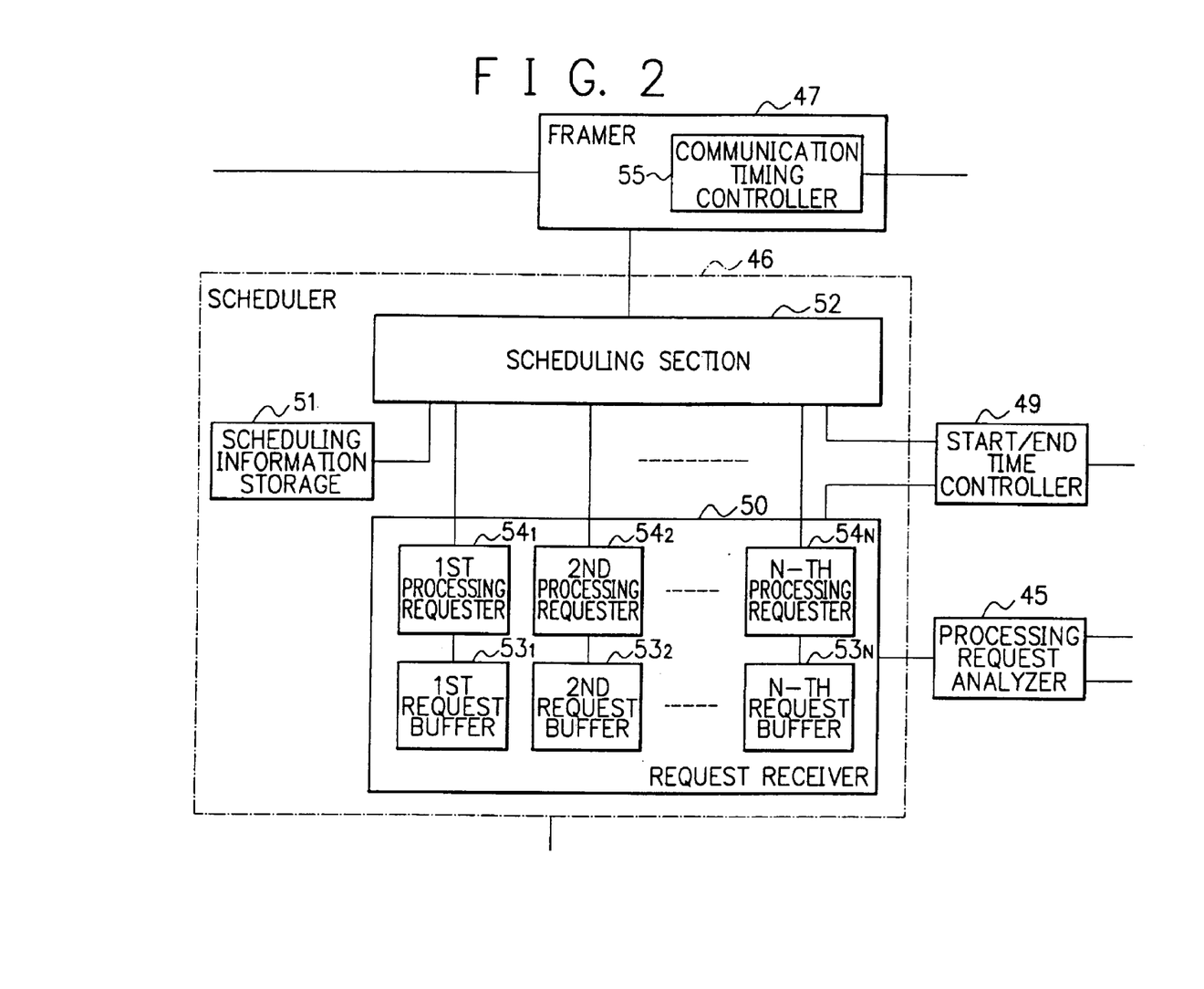
FIG. 2 is a block diagram showing primary sections of a scheduler and a framer of the embodiment of FIG. 1.

FIG. 2 shows main sections of scheduler 46 and framer 47 in base station 41 of FIG. 1. In FIG. 2, the same constituent components as those of FIG. 1 are assigned with the same reference numerals and description thereof will be avoided if possible. Scheduler 46 includes a request receiver 50 to receive, for each request type, various processing requests analyzed by the analyzer 45, a scheduling information storage 51 to store parameters beforehand specified such as a TDMA frame length, a TDMA frame end time, and/or a scheduling end time necessary for the scheduling, and a scheduling section 52 to schedule, according to the scheduling start time controlled by start/end time controller 49, various processing requests received by request receiver 50, by referring to various parameters stored in scheduling information storage 51.

Request receiver 50 includes first to N-th buffers $53_1$ to $53_N$ to accumulate, for each request type in a request order, various requests analyzed by processing request analyzer 45 and first to N-th processing requesters $54_1$ to $54_N$ to send, for each request type, processing requests from associated buffers to scheduling section 52.

Framer 47 includes a communication timing controller 55 to communicate TDMA frames with terminal stations, not shown. Each TDMA frame includes contents of processing associated with processing requests, the contents being allocated to real time positions in the frame according to a result of scheduling by scheduler 46 to assign according to each processing request, for each terminal station, a communication time point and a length thereof in the frame.

In scheduler 46 thus constructed, request receiver 50 receives, for each request type, a forward data transmission request from each terminal station and a reverse data transmission request taking place in base station 41 which are analyzed by processing request analyzer 46. For each processing request received by request receiver 50, scheduling section 52 allocates time slots in a TDMA frame by referring to the parameters in scheduling information storage 51 according to the scheduling start time controlled by start/end time controller 49.

Scheduler 46 includes a CPU, not shown, and can achieve the control operation above according to a control program stored in a predetermined storage such as an ROM.

Figure 3:
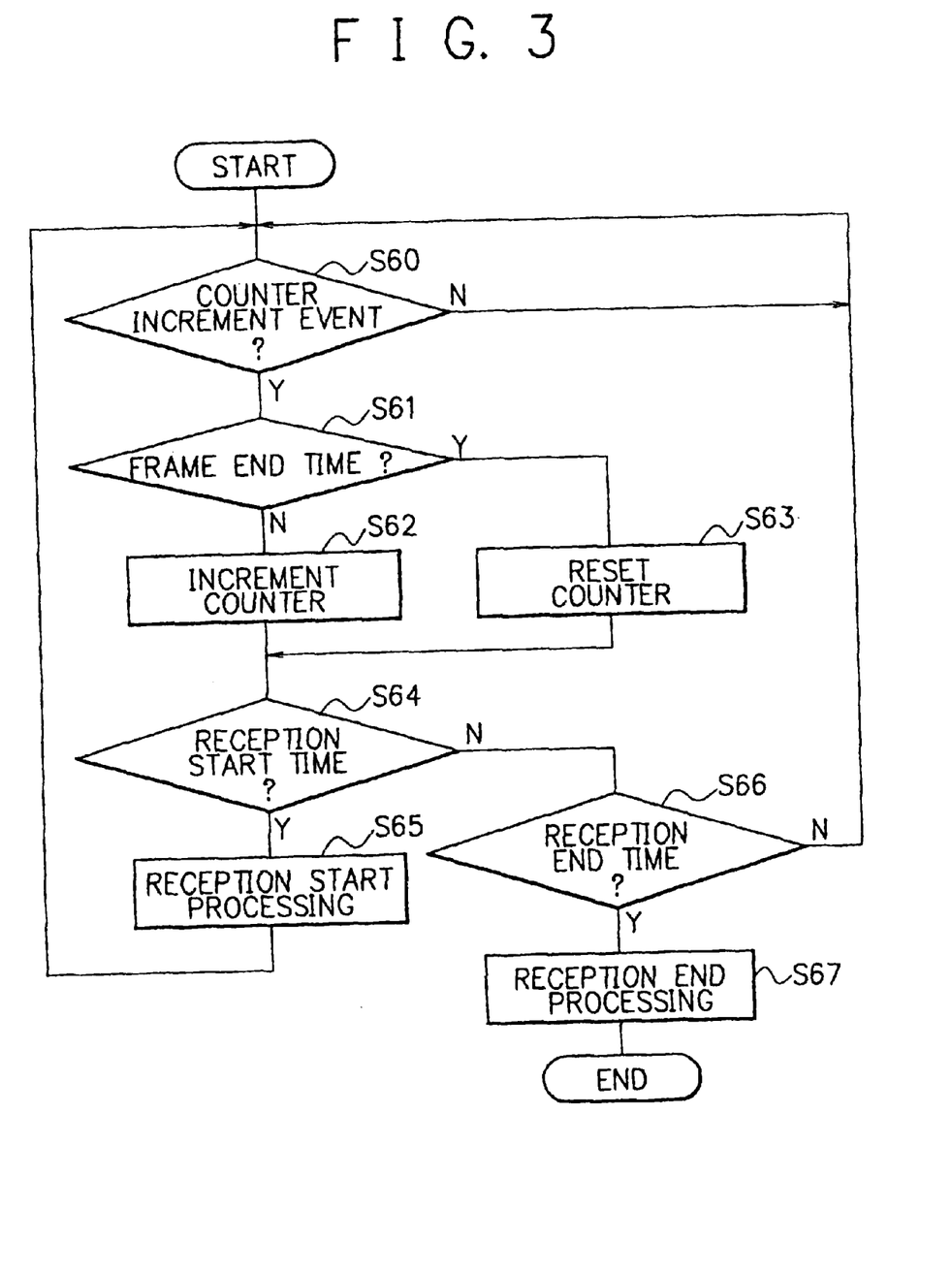
FIG. 3 is a flowchart generally showing a scheduling operation of the embodiment of FIG. 1.

FIG. 3 shows in a general flowchart the contents of scheduling by scheduler 46. Scheduler 46 determines the start and the end of reception of the scheduling by referring to a timer value measured according to a reference timing signal from, for example, a clock in scheduler 46. The timer value is measured by a counter circuit which counts reference timing signals having a fixed frequency at its rising edge.

Scheduling section 52 of scheduler 46 waits for a counter increment event such as a rising edge of the reference timing signal (step S60). When such an event is detected (Y in step S60), a check is made to determine whether or not the frame end time beforehand specified in the scheduling information stored in scheduling information storage 51 is reached (step S61). If the frame end time is not reached (N in step S61), the counter is incremented (step S62). If the frame end time is reached (Y in step S61), the counter is reset (step S63).

Thereafter, a check is made to determine whether or not the scheduling start time notified from start/end time controller 49 is reached (step S64). If the scheduling start time is reached (Y in step S64), scheduling section 52 starts the scheduling (step S65). That is, scheduling section 52 transmits a processing request from one of first to N-th processing request sections 54$_1$ to 54$_N$ of request receiver 50. Scheduling section 52 then waits for a counter increment event (step S60).

If the scheduling start time is not reached (N in step 64), a check is conducted to determine whether or not a reception end time indicating a scheduling end time beforehand specified in the scheduling information stored in scheduling information storage 51 is reached (step S66). If the reception end time is reached (Y in step S66), the reception of processing requests of request receive section 50 is terminated and then the scheduling is terminated (step S67).

The scheduling start time necessary for the scheduling is generated by start/end time controller 49.

Start/end time controller 49 includes a CPU, not shown, to achieve various control operations according to a control program stored in a predetermined storage such as a ROM.

Figure 4:
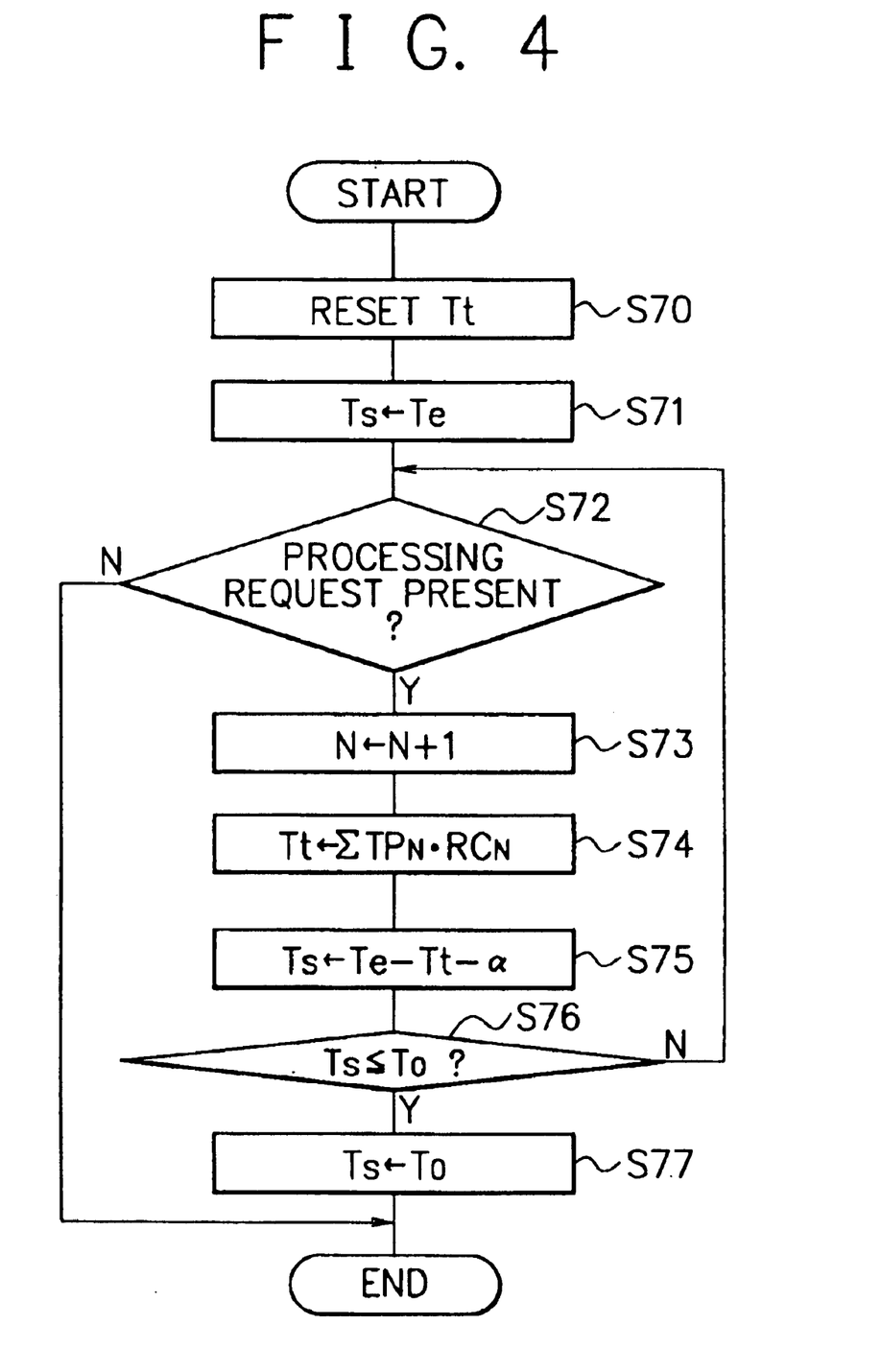
FIG. 4 is a flowchart showing an example of processing to generate a scheduling start time by a start/end time controller of the embodiment of FIG. 1.

FIG. 4 shows in a flowchart an operation of start/end time controller 49 to generate a scheduling start time. In the scheduling, for each frame, a scheduling end time in the frame is advanced by a predetermined time relative to a frame end time. Namely, the scheduling can be carried out using possibly the latest processing request by advancing in time the scheduling start time according to the processing requests received.

At start of operation, start/end time controller 49 resets total time Tt of scheduling processing time (step S70) and conducts initialization to assign scheduling end time Te to scheduling start time Ts (step S71). Having received notification of reception of a processing request from request receiver 50 in step S65 shown in FIG. 3 (Y in step S72), start/end time controller 49 increments internal variable N indicating the number of processing requests (step S73) and calculates the total time necessary for the scheduling for the new processing request (step S74).

Assume that the scheduling start time is Ts, the scheduling end time is Te, and processing requests sent from first to N-th processing requesters 51$_1$ to 54$_N$ to scheduling section 52 are RQ$_1$ to RQ$_N$, respectively. Additionally, periods of scheduling time necessary for the processing requests RQ$_1$ to RQ$_N$ are TP$_1$ to TP$_N$ and reception frequencies of processing requests for the respective request types are RC$_1$ to RC$_N$. Assuming that the same processing request requires the same period of scheduling processing time, total time Tt of scheduling time is expressed as follows.

$$Tt = \Sigma(TP_N \times RC_N) \quad (1)$$

This indicates that total time Tt can be calculated by referring to a table storing a predetermined period of scheduling time for each processing request type.

Thereafter, "Te−Tt−α" is assigned to scheduling start time Ts (Tt≧Te−α; step S75). In this expression, α is a constant or a parameter determined in consideration of a marginal factor such as an error in the calculation of scheduling processing time.

In step S76, a check is made to determine whether or not scheduling start time Ts obtained in step S75 is equal to or less than frame start time T$_0$. If scheduling start time Ts is before frame start time T$_0$ (Y in step S76), it is assumed that the scheduling cannot be achieved within one frame. Frame start time T$_0$ is assigned to scheduling start time Ts and the processing is terminated. If scheduling start time Ts is still after frame start time T$_0$ (N in step S76), it is assumed that the scheduling can be conducted within one frame for another processing request. Therefore, control returns to step S72.

In start/end time controller 49 of this embodiment, for an acceptable processing request occurring after the period of scheduling start time, even if it is detected that a long period of time is required for a large number of processing requests taking place after the scheduling is started, the scheduling start time cannot be updated. Consequently, the processing request appearing at the scheduling start time is passed to the subsequent scheduling and is used to determine next scheduling start time Ts.

The transmission time positions and associated lengths allocated by scheduler 46 are sent to framer 47.

Framer 47 re rs to the transmission time positions and associated lengths as a result of allocation by scheduler 46 to generate TDMA frames in which associated data and control signals are allocated as shown in FIG. 8. For the TDMA frames generated by framer 47, communication timing controller 55 controls timing for communication with terminal stations, not shown, and the TDMA frames are modulated by and are transmitted from transceiver 44.

Next, description will be given of a relationship between scheduling time and frames of scheduler 46 described above.

Figure 5:
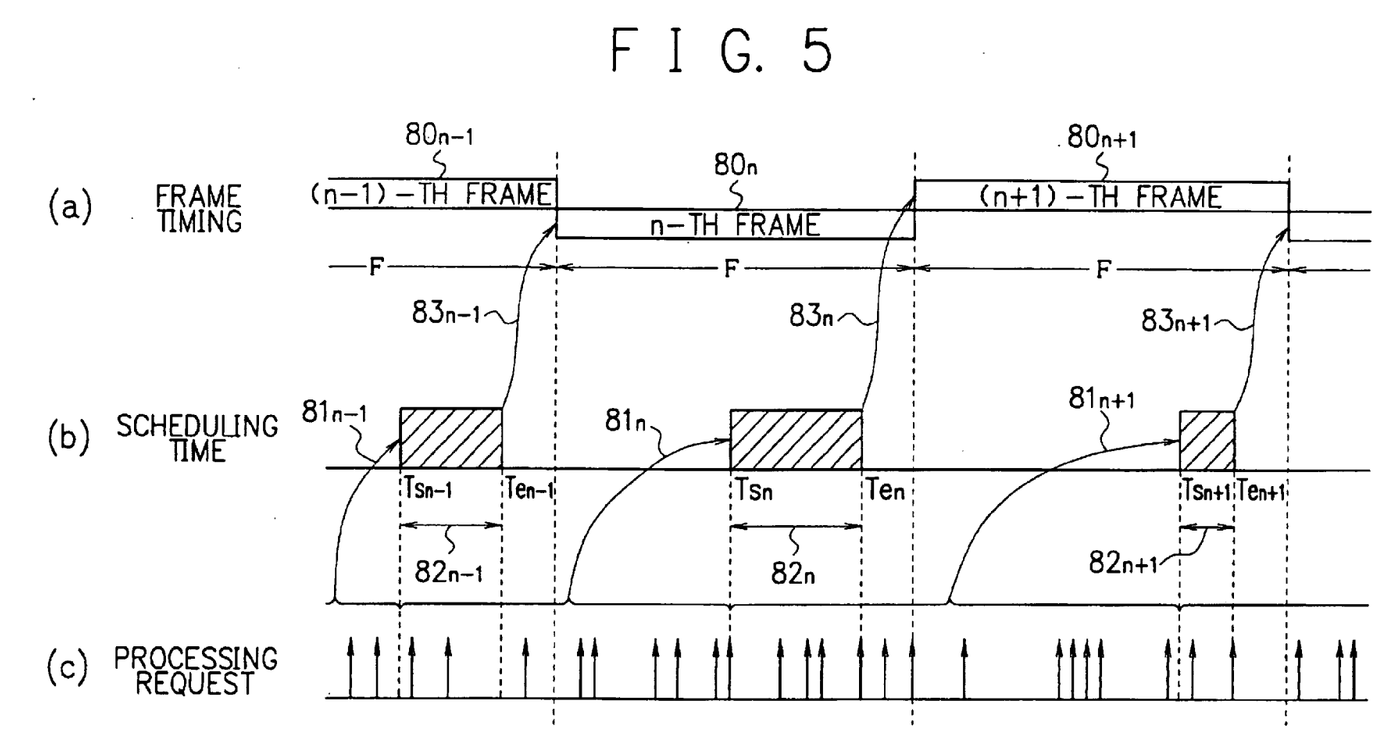
FIG. 5 is a timing chart for explaining a relationship between various processing requests and frames as a result of the scheduling by a scheduler of the embodiment of FIG. 1.

FIG. 5 shows in sections (a), (b), and (c) relationships between various processing requests and frames associated with the scheduling by scheduler 6. Section (a) indicates frame timing, section (b) is scheduling time, and section (c) indicates processing requests asynchronously received by request receiver 50.

As can be seen from FIG. 5($a$), it is assumed that (n−1)-th to (n+1)-th frames 80$_{n-1}$ to 80$_{n+1}$ each having a fixed length F are consecutively communicated with terminal stations, not shown. As shown in FIG. 5($b$), scheduling end time values Te$_{n-1}$ to Te$_{n+1}$ in each frame are advanced relative to the frame end time by a predetermined period of time in scheduling information storage 51.

For example, in n-th frame $80_n$, processing request $81n$ occurring in a period of time from scheduling start time $Ts_{n-1}$ of the preceding frame, i.e., (n–1)-th frame $80_{n-1}$ to scheduling start time $Ts_n$ of n-th frame $80_n$ is scheduled using scheduling time $82n$. The scheduling time is equivalent to "Tt+α" in each frame. The processing result obtained in each scheduling time is reflected in the next frame ($83_{n-1}$ to $83_{n+1}$). When no processing request occurs in each frame before the scheduling start time, the scheduling is conducted for the subsequent frame.

In this embodiment, the scheduling end time is fixed for each frame, but the scheduling start time is variable. Consequently, the condition of the latest processing request can be reflected in the next frame scheduling.

As above, in the radio communication system conducting DSA to which the scheduling controller of the embodiment is applied, the base station calculates, for each TDMA frame, the scheduling start time according to the number of processing requests for each request type appearing from the predetermined scheduling end time (the scheduling start time of the preceding frame) to the scheduling start time of the pertinent from to flexibly control time in the scheduling. Therefore, the scheduling result associated with the scheduling time necessary for respective processing requests can be reflected in the next frame. Consequently, the condition of the latest processing request is reflected in the next frame scheduling. That is, by moving the scheduling start time backward in time, the new condition can be used as information for a processing request at the scheduling start time, and the scheduling can be controlled in a desirably realtime fashion.

Variation

In the description, the embodiment is applied to a radio communication system accomplishing DSA. However, the present invention is not restricted by the embodiment. For example, the present invention is also applicable to an information processing system that conducts selection for processing requests for a plurality of processors.

Figure 6:
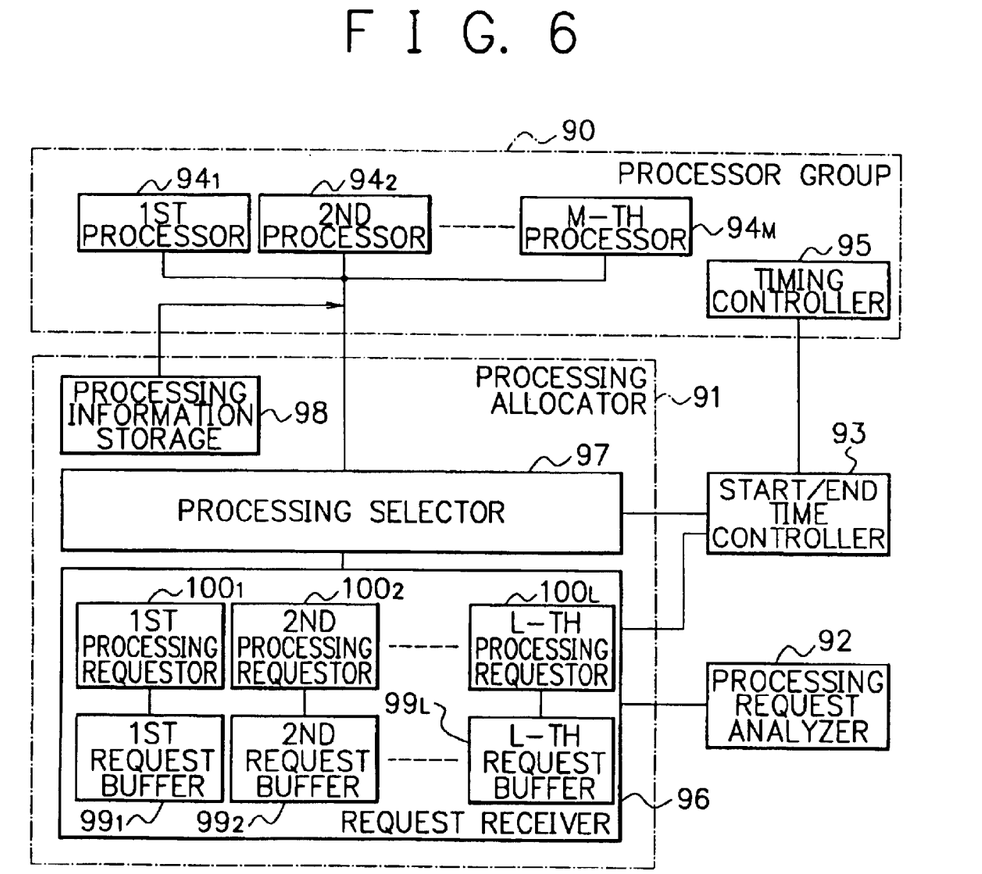
FIG. 6 is a block diagram showing a general configuration of a variation of the embodiment of an information processing system employing a scheduling controller in accordance with the present invention.

FIG. 6 shows in a block diagram a general configuration of an information processing system to which the variation of the scheduling controller is applied. The information processing system includes a processor group 90 including a plurality of processors, a processing allocator 91 to schedule and to allocate processing to the respective processors of processor group 90, a processing request analyzer 92 to analyze processing requests to the respective processors, and a start/end time controller 93 to control a scheduling start time.

Processor group 90 includes first to M-th processors $94_1$ to $94_M$ and a timing controller 95. Processing allocator 91 includes a request receiver 96 to receive various processing requests analyzed by processing request analyzer 92, a processing selector 97 to assign various processing requests received by request receiver 96 to the plural processors of processor group 90, and a processing information storage 98 to store parameters to select processors. Request receiver 96 includes first to L-th buffers $99_1$ to $99_L$ to accumulate for each request type in a request order the various requests analyzed by processing request analyzer 92 and first to L-th processing requesters $100_1$ to $100_L$ to send, for each request type, processing requests from associated buffers to processing selector 97.

In the information processing system configured as above, when request receiver 96 receives a processing request from processing request analyzer 92, the request is stored in one of first to Lath processing requesters $99_1$ to $99_L$, the buffer corresponding to a processing request type of the request. Start/end time controller 93 monitors a state of storage of processing requests in first to L-th processing requesters $99_1$ to $99_L$ of request receiver 96 and controls the scheduling start time according to the storage state. The scheduling start time is almost the same as that calculated by the start/end time controller of the embodiment. Namely, the scheduling start time is calculated by calculating the total scheduling time for each processing request and hence will not be described.

Start/end time controller 93 notifies the scheduling start time to processing selector 97 and timing controller 95. From the scheduling start time notified to a predetermined scheduling end time, processing selector 97 schedules various processing requests from request receiver 96 to allocate processing to at least one processor. A result of the allocation is sent together with parameters such as initial values of various processing stored in processing information storage 98 to first to M-th processors $94_1$ to $94_M$. Timing controller 95 of processor group 90 receives the scheduling start time from start/end time controller 93 and controls according thereto various timing necessary for distributed processing such as generation of synchronized timing between the processors. Although a term of processor is used in the description, "processor" may be replaced with a term "processing algorithm".

In the information processing system using the variation as described above, like in the radio communication system employing the embodiment, the scheduling start time is calculated according to various processing requests such that the processing requests can be allocated to a plurality of processors using the latest processing condition. This advantageously leads to a flexible scheduling operation.

In the description of the embodiment and the variation, only the scheduling start time is changed. However, the present invention is not restricted by this embodiment. The scheduling end time may also be specified as a parameter that can be changed for each frame or according a state of processing requests.

In the embodiment, it is assumed in the calculation of total time Tt that the same scheduling time is required for the same processing request. However, even for the same processing request, when the number thereof increases, the time required for the scheduling becomes actually longer. To cope with this situation, there may be arranged a table in which scheduling time is beforehand set for each processing request type according to frequency of receptions thereof in consideration of the linearity above. By this table, total time Tt of the scheduling time can be more precisely calculated. Total time Tt of the scheduling time may also be calculated in consideration of the data transfer speed which is changed according to use of the internet, a television telephone, and/or an electronic mail.

In the description of the embodiment, the scheduling is carried out between the radio base station and radio terminal stations. However, the present invention is not restricted by this embodiment. For example, the present invention is applicable to a wired communication system for point-to-multipoints connections in which the scheduling is achieved between an exchange and a group of terminal stations or between an exchange and another exchange via one physical communication line. For example, in a system using a bi-directional line in which one physical line is shared among a plurality of communication devices and in which an exchange centrally controls connections therebetween, the exchange collects band pass requests from respective stations to control scheduling start time. Alternatively, in the scheduling between exchanges, a transmission side thereof collects processing requests from another exchange and conducts the scheduling for a communicating exchange to control the scheduling start time. In the physically one-directional communication line, it is sufficient that the scheduling is conducted on the transmission side. When each of the transmission and reception sides includes a function of transmission side and a function of reception side, the communication can be easily achieved only if each side has two one-directional lines.

In a system which differs from the embodiment in that the start/end time need not be controlled for each frame, for example, the scheduling is executed once per several frames or per several microseconds, namely, in a system in which the processing need not be executed in a realtime manner, it is only necessary to correspondingly reflect a change of parameters in the start/end time control operation at a long-term interval. This introduces a flexible concept of time in the system and advantageously leads to an efficient scheduling operation.

In the embodiment, the scheduling is carried out for frames each having an identical length in time. However, the scheduling can also be applied to a case in which the frames have various lengths in time. In such a situation, it is only necessary to add parameters of time such as a frame start time and a frame end time. By these parameters, the scheduling can also be flexibly achieved. However, the unit of time is not limited to a frame.

In the embodiment, the start time and the end time are within one frame according to the start/end time control operation. However, the present invention is not restricted by the embodiment. For example, the present invention is applicable even when the start/end time control operation is conducted up to the preceding or succeeding frame. This corresponds to a case in which, for example, the scheduling of a latter half of the frame is not required at the first section of the frame.

Although only the scheduling start time is changed in the description of the embodiment and the variation, the present invention is not restricted by the embodiment and the variation. For example, a time limit at an intermediate stage in the time allocation associated with processing requests and a time limit for a processing step that occurs in relation to processing requests may be provided as parameters.

The embodiment and the variation employ parameters of points of processing time such as the scheduling start time and the scheduling end time. This does not restrict the present invention. Namely, there may be additionally used parameters for each processing content. For example, the scheduling may be conducted by setting parameters for various processing types: a start time $t_{11}$, an end time $t_{12}$, and an intermediate time $t_{13}$ for a processing step and a start time $t_{21}$, an end time $t_{22}$, and an intermediate time $t_{23}$ for another processing step. Namely, it is possible to respectively set a time limit at an intermediate stage in the time allocation according to processing requests and a time limit for another processing step required in association with a processing request. In this situation, the parameters are sequentially arranged as $t_{12}=t_{21}$", "$t_{22}=t_{31}$", and so on such that the start/end time control operation is conducted for each processing request and for the total of processing requests.

In the embodiment and the variation, the processing requests are buffered for each processing request type. This however does not restrict the present invention. The present invention is also applicable to a case in which when the processing request receiver receives a processing request, the request is developed into a plurality of processing requests. In this situation, the necessary processing time need only be calculated according to the processing requests developed.

In the description of the embodiment and the variation, the processing is arranged sequentially in time as in the scheduling of a sequence of points of time. However, the present invention is restricted neither by the embodiment nor by the variation. For example, it may also be possible to respectively select the processors to control a plurality of start/end points of time for concurrent processing. In this case, parameters necessary for the various selections are set to each processor.

As described above, in accordance with claims 1 and 5, during a period of time from when a processing request occurs to when the scheduling is started for the request, conditions for the processing requests are updated at moments asynchronously with respect to the processing request. Therefore, when the invention is applied to a system in which various parameters necessary for the scheduling are determined at the scheduling start point, the scheduling start time can be advanced to a later point of time to reserve or to set processing time necessary for the scheduling. As a result, the processing wait time can be minimized and the scheduling is controlled with a highly realtime manner in which the latest condition can be possibly used for the processing request received.

When the invention in accordance with claims 2 and 6 is applied to the dynamic slot allocation in which time slots are allocated in a frame such that each scheduling is separately conducted at a fixed interval of time, there is obtained the advantage of the control operation in accordance with claim 1 or 4.

In accordance with the invention described in claim 3, the processing time necessary for the scheduling is set in the system and the scheduling end time dependent on the system is arranged as a parameter to be varied when necessary. In consequence, the scheduling can be more flexibly carried out.

In accordance with claim 4, by referring to the scheduling time beforehand stored for each processing request, the scheduling time is accumulated using the number of the processing requests in the calculation of the scheduling start time to calculate the total time of the scheduling time. Therefore, the scheduling start time can be easily obtained by a simple configuration.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A scheduling controller, comprising:
   a request receiving device for receiving a plurality of processing requests according to request type;
   a start time calculating device for calculating, according to a number of processing requests received by the request receiving device and according to the types of the requests received, a scheduling start time relative to a predetermined scheduling end time;
   a scheduling device for scheduling processing requests received by the request receiving device from the scheduling start time calculated by the start time calculating device to the scheduling end time; and
   a storage device for storing the predetermined scheduling end time;
   wherein the start time calculating device calculates, according to the processing requests received by the request receiving device, a scheduling start time relative to the scheduling end time stored in the device.

2. A scheduling controller, comprising:

requests receiving means for receiving processing requests from a plurality of terminal stations, each of the processing request being a transmission band pass request and including a transmission request and a data length thereof;

start time calculating means for calculating, according to the processing request received by the request receiving means, a scheduling start time relative to a predetermined scheduling end time;

scheduling means for allocating processing requests, received by the request receiving means from the scheduling start time calculated by the start time calculating means to the scheduling end time, to time slots in a frame; and reporting means for reporting information of time slot allocation by the scheduling means to the terminal stations.

3. A scheduling controller comprising:

request receiving means for receiving a plurality of processing requests;

start time calculating means for calculating, according to a number of processing requests received by the request receiving means and types thereof, a scheduling start time relative to a predetermined scheduling end time;

scheduling means for scheduling processing requests received by the request receiving means from the scheduling start time calculated by the start time calculating means to the scheduling end time; and storage means for storing the predetermined scheduling end time;

wherein the start time calculating means calculates, according to the processing requests received by the request receiving means, a scheduling start time relative to the scheduling end time stored in the storage means.

4. A scheduling controller comprising:

request receiving means for receiving a plurality of processing requests;

start time calculating means for calculating, according to a number of processing requests received by the request receiving means and types thereof, a scheduling start time relative to a predetermined scheduling end time;

scheduling means for scheduling processing requests received by the request receiving means from the scheduling start time calculated by the start time calculating means to the scheduling end time;

processing time storage means for storing scheduling time determined beforehand for each of the processing requests;

wherein the start time calculating means calculates a total time of scheduling time according to scheduling time corresponding to each processing request type stored in the processing time storage means and calculates, according to the processing requests received by the request receiving means, a scheduling start time relative to the scheduling processing end time.

5. A scheduling method, comprising the steps of:

receiving a plurality of processing requests according to request type;

calculating, according to a number of processing requests received by the request receiving step and according to the types of requests received, a scheduling start time relative to a predetermined scheduling end time;

scheduling processing requests received by the request receiving step from the scheduling start time calculated by the start time calculating step to the scheduling end time;

storing the predetermined scheduling end time;

wherein the calculating step calculates a scheduling start time relative to the stored predetermined scheduling end time.

6. A scheduling method, comprising the steps of:

receiving processing requests from a plurality of terminal stations, each of the processing requests being a transmission band pass request and including a transmission request and a data length thereof;

calculating, according to the processing requests received by the request receiving step, a scheduling start time relative to a predetermined scheduling end time;

allocating processing requests, received by the request receiving step from the scheduling start time calculated by the start time calculating step to the scheduling end time, to time slots in a frame; and reporting information of time slot allocation by the scheduling step to the terminal stations.

7. A scheduling controller in accordance with claim 2, further including storage means for storing the predetermined scheduling end time, wherein the start time calculating means calculates, according to the processing requests received by the request receiving means, a scheduling start time relative to the scheduling end time stored in the storage means.

8. A scheduling controller in accordance with claim 2, further including processing time storage means for storing scheduling time determined beforehand for each of the processing requests, wherein the start time calculating means calculates total time of scheduling time according to scheduling time corresponding to each processing request type stored in the processing time storage means and calculates, according to the processing requests received by the request receiving means, a scheduling start time relative to the scheduling processing end time.

9. A scheduling controller in accordance with claim 3, further including processing time storage means for storing scheduling time determined beforehand for each of the processing requests, wherein the start time calculating means calculates total time of scheduling time according to scheduling time corresponding to each processing request type stored in the processing time storage means and calculates, according to the processing requests received by the request receiving means, a scheduling start time relative to the scheduling processing end time.

10. A scheduling controller in accordance with claim 2, wherein the start time calculating means calculates the scheduling start time according to the processing request received by the request receiving means and types thereof.

11. A scheduling method according to claim 6, wherein calculating the scheduling start time includes calculating according to the processing request received by the request receiving means and types thereof.

12. A scheduling controller, comprising:

a requests receiving device for receiving processing requests from a plurality of terminal stations, each of the processing request being a transmission band pass request and including a transmission request and a data length thereof;

a start time calculating device for calculating, according to the processing request received by the request receiving device, a scheduling start time relative to a predetermined scheduling end time;

a scheduling device for allocating processing requests, received by the request receiving device from the scheduling start time calculated by the start time calculating device to the scheduling end time, to time slots in a frame; and a reporting device for reporting information of time slot allocation by the scheduling device to the terminal stations.

13. A scheduling controller comprising:

a request receiving device for receiving a plurality of processing requests;

a start time calculating device for calculating, according to a number of processing requests received by the request receiving device and types thereof, a scheduling start time relative to a predetermined scheduling end time;

a scheduling device for scheduling processing requests received by the request receiving device from the scheduling start time calculated by the start time calculating device to the scheduling end time;

a processing time storage device for storing scheduling time determined beforehand for each of the processing requests;

wherein the start time calculating device calculates a total time of scheduling time according to scheduling time corresponding to each processing request type stored in the processing time storage device and calculates, according to the processing requests received by the request receiving device, a scheduling start time relative to the scheduling processing end time.

* * * * *